(12) United States Patent
Fritsch

(10) Patent No.: US 9,660,820 B2
(45) Date of Patent: May 23, 2017

(54) MEASURING MACHINE COMMUNICATION

(71) Applicant: HEXAGON TECHNOLOGY CENTER GMBH, Heerbrugg (CH)

(72) Inventor: Robert Fritsch, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 352 days.

(21) Appl. No.: 14/415,196

(22) PCT Filed: Jul. 18, 2013

(86) PCT No.: PCT/EP2013/065235
§ 371 (c)(1),
(2) Date: Jan. 16, 2015

(87) PCT Pub. No.: WO2014/013034
PCT Pub. Date: Jan. 23, 2014

(65) Prior Publication Data
US 2015/0207639 A1    Jul. 23, 2015

(30) Foreign Application Priority Data

Jul. 20, 2012    (EP) .................................. 12177297

(51) Int. Cl.
*H04L 12/28*    (2006.01)
*H04L 12/18*    (2006.01)
(Continued)

(52) U.S. Cl.
CPC ............ *H04L 12/18* (2013.01); *G01B 21/047* (2013.01); *H04L 7/02* (2013.01);
(Continued)

(58) Field of Classification Search
CPC . H04L 12/18; H04L 45/72; H04L 7/02; H04L 12/40169; G01B 21/047; G01B 2210/58
See application file for complete search history.

(56) References Cited

U.S. PATENT DOCUMENTS 5,666,557 A    9/1997    Cassidy et al.
5,874,903 A    2/1999    Shuey et al.
(Continued)

FOREIGN PATENT DOCUMENTS

CN    101803295 A    8/2010
CN    101719791 A    6/2016
(Continued)

OTHER PUBLICATIONS

European Search Report dated Dec. 20, 2012 as received in Application No. 12 17 7297.

*Primary Examiner* — Afshawn Towfighi
(74) *Attorney, Agent, or Firm* — Maschoff Brennan

(57) ABSTRACT

Embodiments of the invention relate to a method for line-conducted bidirectional communication between subscribers in a measuring system, the subscribers being arranged in a chain-like series structure. In said series structure, each of the subscribers is connected to one of the subscribers that precedes same by means of a first communication interface and to one of the subscribers that follows same by means of a second communication interface. Each of the subscribers has a message processing unit, by means of which the first and second communication interfaces can be operated independently of each other in order to send and/or receive a message. In the communication by the message processing unit, the message is received as a digital data structure by means of the first communication and an identification range of the message is evaluated by comparing a content of the identification range within specified target criteria.

21 Claims, 7 Drawing Sheets

(51) Int. Cl.
  *G01B 21/04* (2006.01)
  *H04L 12/40* (2006.01)
  *H04L 7/02* (2006.01)
  *H04L 12/721* (2013.01)

(52) U.S. Cl.
  CPC ........ *H04L 12/40169* (2013.01); *H04L 45/72* (2013.01); *G01B 2210/58* (2013.01)

(56) References Cited

U.S. PATENT DOCUMENTS

| | | | |
|---|---|---|---|
| 6,219,928 | B1 | 4/2001 | Raab et al. |
| 7,675,433 | B2 | 3/2010 | Hellwig |
| 8,076,595 | B2 | 12/2011 | Uster |
| 8,493,919 | B2 | 7/2013 | Leung |
| 2005/0251403 | A1* | 11/2005 | Shuey .................... G06Q 50/06 705/412 |
| 2009/0135716 | A1* | 5/2009 | Veillette ................. G01D 4/004 370/221 |
| 2009/0138866 | A1* | 5/2009 | Veillette .................... G06F 8/67 717/168 |
| 2016/0205018 | A1* | 7/2016 | Li ......................... H04L 45/745 370/392 |

FOREIGN PATENT DOCUMENTS

| | | |
|---|---|---|
| DE | 199 28 716 A1 | 2/2000 |
| DE | 101 21 461 A1 | 11/2002 |
| DE | 10 2006 025 174 A1 | 12/2007 |
| EP | 2 042 839 A1 | 4/2009 |
| EP | 2 270 425 A1 | 1/2011 |
| WO | 98/03921 A1 | 1/1998 |
| WO | 2004/039010 A1 | 5/2004 |
| WO | 2005/017448 A1 | 2/2005 |
| WO | 2006/079604 A1 | 8/2006 |
| WO | 2007/104668 A1 | 9/2007 |

* cited by examiner

Fig. 4

| Identifier | Appliance I | Identifier | Appliance II | Identifier | Appliance III | Identifier | Appliance IV | Identifier |
|---|---|---|---|---|---|---|---|---|
| R0 → | eval |  |  |  |  |  |  |  |
| ← A |  |  |  |  |  |  |  |  |

Fig. 5

| Identifier | Appliance I | Identifier | Appliance II | Identifier | Appliance III | Identifier | Appliance IV | Identifier |
|---|---|---|---|---|---|---|---|---|
|  |  |  |  |  |  |  | f(x) = x-1 | ← R1 |
|  |  |  |  |  | eval | ← R0 |  |  |
|  |  |  |  |  |  | B → | f(x) = x |  |
|  |  |  |  |  |  |  |  | B → |

Fig. 6

| Identifier | Appliance I | Identifier | Appliance II | Identifier | Appliance III | Identifier | Appliance IV | Identifier |
|---|---|---|---|---|---|---|---|---|
| R → | f(x) = x | R → | f(x) = x | R → | f(x) = x | R → | f(x) = x | R → |
| ← D0 | eval |  | eval |  | eval |  | eval |  |
| ← E1 |  | ← E0 |  | ← F0 |  | ← G0 |  |  |
| ← F2 | f(x) = x+1 | ← F1 | f(x) = x+1 | ← G1 | f(x) = x+1 |  |  |  |
| ← G3 |  | ← G2 |  |  |  |  |  |  |

| Ident-ifier | Appliance I | Ident-ifier | Appliance II | Ident-ifier | Appliance III | Ident-ifier | Appliance IV | Ident-ifier |
|---|---|---|---|---|---|---|---|---|
| R0 → | eval | | | | | | | |
| | | B → | f(x) = x | | | | | |
| | | | | B → | f(x) = x | | | |
| | | | | | | B → | f(x) = x | |
| | | | | | | | | B → |

Fig. 7

| Ident-ifier | Appliance I | Ident-ifier | Appliance II | Ident-ifier | Appliance III | Ident-ifier | Appliance IV | Ident-ifier |
|---|---|---|---|---|---|---|---|---|
| V2 → | f(x) = x-1 | | | | | | | |
| | | V1 → | f(x) = x-1 | | | | | |
| | | | | V0 → | eval | | | |
| | | | f(x) = x eval | ←W | | W→ | f(x) = x eval | |
| | f(x) = x eval | ←W | | | | | | W → |
| ←W | | | | | | | | |

Fig. 8

| Ident-ifier | Appliance I | Ident-ifier | Appliance II | Ident-ifier | Appliance III | Ident-ifier | Appliance IV | Ident-ifier |
|---|---|---|---|---|---|---|---|---|
| K2 → | f(x) = x-1 | | | | | | | |
| | | K1 → | f(x) = x-1 | | | | | |
| | | | | K0 → | eval | | | |
| | | | | ← G0 | | | | |
| | | | f(x) = x+1 | | | | | |
| | f(x) = x+1 | ← G1 | | | | | | |
| ← G2 | | | | | | | | |

*Fig. 9*

| Ident-ifier | Appliance I | Ident-ifier | Appliance II | Ident-ifier | Appliance III | Ident-ifier | Appliance IV | Ident-ifier |
|---|---|---|---|---|---|---|---|---|
| | | | event | R1 → | f(x) = x-1 | | | |
| | | | | | | R0 → | eval | |
| | | | | | | ← G0 | | |
| | | | | ← G1 | f(x) = x+1 | | | |
| | | | eval | | | | | |
| | | ← W | | | | | | |

*Fig. 10*

MEASURING MACHINE COMMUNICATION

FIELD OF THE INVENTION

The invention relates to a method for bidirectional communication between subscribers in a measuring system, to a subscriber, and to a coordinate measuring device equipped with such subscribers.

BACKGROUND

Where there are a large number of technical devices, a plurality of electronic subsystems are interconnected in a communication union, said subsystems being able to be attributed a wide variety of functions, for example sensors, actuators, switches, displays, measuring units, controller systems, monitor systems, monitoring and debug devices, etc. These may be permanently installed and connected up in the device—for example during production of the device—but may also be modularly exchangeable, be it during servicing or during regular operation.

The present invention relates particularly to measuring systems. Examples of such measuring systems, which are designed as coordinate measuring devices, can be found in WO 2005/017448, EP 2 270 425 or WO 2006/079604, for example. These measuring systems have a plurality of subsystems, specifically in the form of electronic linear and/or rotary position sensors for measured value capture that are in a communication relationship with a controller for the purpose of measured value evaluation and control of the measuring processes. These subsystems are usually arranged in a physical distribution on the device, which means that set up of the communication link between the subsystems has an associated corresponding level of wiring complexity. The subscribers to the communication are thus wired in order to set up the communication link and/or a supply of power, and the present invention therefore involves wired or line-connected communication rather than a wireless radio system with free-space transmission. Besides the position sensors, there may also be further devices, for example probes, measuring heads, sensors, e.g. for sensing ambient conditions such as temperature, etc., or else actuators such as axle drives, motorized swivel heads, display elements, etc. In order to keep down a wiring complexity, there is an attempt in the measuring machines to use as few communication links as possible, preferably just one communication link, for all devices involved. An attempt is also made to design the communication links advantageously, that is to say to avoid double line runs as far as possible, for example, these occurring many times when each subsystem has star-shaped wiring to the controller, for example.

Besides the subsystems described above, which are usually mounted on the measuring system permanently, exchangeable components may also be involved in the measurement, for example exchangeable measuring heads, measuring sensors, supplementary joints, optical sample heads, etc., which are conditioned for a wide variety of measuring tasks and are likewise involved in the device communication. Since they are exchangeable during operation or in the course of reconfiguration, the communication system also changes in this case. Servicing work and repairs may also require replacement of a subsystem in the communication system.

In the case of such measuring systems, the communication between the devices or subsystems, that is to say the subscribers of the communication system, is often effected using bus structures. By way of example, a bus structure—such as RS232, RS422, RS423, RS485 or else others—can be used for communication. A popular topology that is often advantageous for the local arrangement of the devices in the measuring system is a serial structure. In this structure, the subscribers are arranged one after the other and connected to the bus with just one cable between the devices in each case. In this arrangement, the subscribers often also include several of the same kind, e.g. several position sensors of the same type, which use the shared bus to communicate with a control unit, that is to say to transmit the position information they ascertain to the control unit, for example. For the purpose of simple storage and maintenance, the subsystems of the same kind usually have no difference whatsoever prior to installation into the measuring system, which means that they can be used at a wide variety of locations in the machine.

During application, however, it is important for the subsystems connected to the bus to be able to be distinguished and identified, even if they are the same kind of subsystems. In the case of coordinate measuring devices, it is essential to know during surveying, for example, which position sensor is used to sense which movement axis in the measuring system.

To this end, it is possible to use a device address, for example, which can be set on the subscribers. This address is often allocated only directly before or after installation of the subscriber, for example by means of DIP switches, coding connectors, electronic programming devices, etc. Such an approach is susceptible to error and time-consuming, however.

In the literature, other areas of technology have a few approaches for avoiding manual address allocation. By way of example, U.S. Pat. No. 5,666,557 describes automatic addressing of peripheral devices in a data processing system using connector identifiers;

WO 98/03921 describes the automatic recognition of the order of devices of a network communication device on the basis of a pulse length of a supplementary signal;

WO 2004/039010 describes the setting of addresses for child devices by a parent device;

WO 2007/104668 and DE 10 2006 025 174 describe address allocation for driver assistance systems.

A common feature of all these known approaches is that the subscribers are allocated an address externally. Even in the case of the above approaches, this is complex and in many cases requires additional hardware—such as coding switches, coding connectors, additional connector pins, etc. The complexity for allocating this address, whether during production, startup or in the course of bus initialization, is also not negligible. In addition, allocation of incorrect addresses is a frequent source of error in measuring systems, specifically when components are exchanged during servicing. Transposed addresses of communication subscribers can cause not only malfunctions but also hardware damage.

SUMMARY

Some embodiments of the present invention improve the communication of subscribers in a measuring machine.

Some embodiments provide a measuring machine communication system that is simple and inexpensive to realize and in which the need for specific address allocation for each subscriber is dispensed with—specifically explicit, distinct address allocation to the subscribers externally.

Some embodiments are also that all subscribers or classes of subscribers in the machine communication system may be in similar form in terms of their communication interfaces and no subscriber-specific configurations, for example in the form of address coding, are necessary prior to the use of said subscribers or classes of subscribers in the communication system.

Some embodiments provide an improved communication method for subsystems in a machine, particularly in a measuring machine.

Some embodiments provide a corresponding method for communication by subscribers in the measuring machine communication system in which it is possible to dispense with specific address allocation for each of the subscribers.

Some embodiments are also the provision of appropriate subscriber software for implementing the method.

In a communication system or communication method according to the invention, no allocation of a subscriber-specific address that is distinct in the communication system is performed for the individual subscribers of the communication system. This simplifies storage, production and servicing and helps to avoid careless mistakes in address allocation or address coding.

The present invention dispenses with a specific address that is dedicated and distinct to each subscriber. The subscribers on the communication system organize themselves without each of them being assigned a specific address. A possibly existent controller can concentrate fully on the control task and is primarily not needed for the communication relationships; it is thus not relevant as a communication master for this communication according to the invention and, in particular, performs no address allocation for the subscribers, that is to say may be of equivalent design to the remainder of the subscribers in terms of its communication interface and the communication sequence.

In the communication system according to the invention, the subscribers are arranged in a serial structure and the bus used, that is to say the physical communication lines or communication channels, has its hardware separated in each device. Thus, in the case of a subscriber—which is not situated at the start or end of the bus, in particular—a first and at least one second communication interface are used for communication and set up a communication relationship for the subscriber with a predecessor and a successor, respectively. This allows the subscriber, on the basis of the interface used, to distinguish the left neighbor from the right neighbor, that is to say the predecessor and the successor. In this case, the subscribers form a kind of chain and the communication between the subscribers takes place on a one-to-one basis in each case, that is to say directly between two subscribers and not via a global bus line to a plurality of or all subscribers simultaneously, as would be the case with a radio transmission or for classic Ethernet via coaxial cable, for example.

In this case, the left and right parts of the communication bus are physically separate inside the subscribers at the bottommost level. Thus, no direct hardware loop-through of the communication lines from the first and the second interface in the form of an electrical contact takes place. Thus, physical communication interfaces and physical connections between the subscribers are involved, that is to say specifically an OSI layer 1 (=physical layer) connection, for example, and not purely logical structures on higher levels that can be implemented purely in software, for example.

When message forwarding takes place from the first to the second interface or vice versa, this occurs on a higher protocol level, that is to say specifically OSI layer 2 (=data link layer), for example, as explained below. The function of the subscriber could therefore be described in a similar manner to that of a bridge. Alternatively, functions similar to a repeater or a router may be implemented in the criteria and/or the mapping.

In this case, a buffer store for received messages can also be implemented inside the subscribers, for example in order to avoid access conflicts on the interface. By way of example, such conflicts can arise when forwarding of a received message and simultaneous sending of a message generated in the subscriber itself are pending. In the case of an interface that operates in half-duplex mode, access conflicts could also arise for simultaneous sending and receiving of messages, these likewise being able to be avoided by buffer-storing the message to be sent.

A suitable communication bus within the meaning of the present invention is a wide variety of systems and wired physical propagation paths, for example optical or electrical. By way of example, the communication interfaces may be embodied as specified in RS232, RS422, RS423, RS485, for example. A multiplicity of further electronic components or IP cores for communication interfaces are also known that could be used according to the invention for communication between two respective subscribers.

As already mentioned, the communication takes place in the form of messages that can be sent and/or received via the communication interfaces. The messages are digitally presented information that is forwarded in the form of data streams—usually transmitted in packet form—via the interfaces from one subscriber to the next. The data content of these messages can be interpreted as appropriate and may have a preamble, an identifier region, a command region, a data region, a checksum region or a combination—defined in accordance with the transmission protocol used—of these regions, for example.

These messages are sent via an interface of a preceding subscriber and received by an interface of the subscriber connected thereto.

In this case, the subscribers have—as already explained—no explicit addresses distinctly assigned on a subscriber-specific basis that prompt the messages to be evaluated in order to decide whether or not the message is processed by the subscriber.

According to the invention, an identifier region of a received message is instead evaluated by comparing it in the subscriber with prescribed conditions, which conditions are not simple comparisons with a subscriber address that is distinctly coded on a subscriber-specific basis on each of the subscribers, however. In this case, each subscriber stores mapping for the message identifier x. Without limiting generality, the principle is explained below by using a message identifier x in the form of a number from the range of integers and a mapping function for the message identifier x in the form of $f(x)=x-1$. In practical implementations, the type and/or value range of the identifiers and also the mapping function can also be chosen differently.

If, in a simple, good example, the message identifier x of a received message has a predefined value, for example zero, then this message is processed in the receiving subscriber. Otherwise, the received message identifier x is decreased by one in accordance with the mapping function $f(x)=x-1$ and the modified message is then forwarded via a different interface than the one via which the message was received. In this case, the predefined value is not a subscriber-specific address, however, but rather is the same for all subscribers or groups of multiple subscribers.

As part of the processing of the message in the subscriber, it may be possible for a response to the message to be generated that is sent from the subscriber to one or more other subscribers. The generated response can be returned in the direction from which the inquiring message came, forwarded in the other direction or sent in both directions. In the case of some messages, a response can also fail to appear and nothing may be sent. The mapping function may therefore also be dependent on the interface s at which the message was received, particularly for the choice of transmission interface via which any forwarding and/or response takes place. By way of example, this may thus be as the mapping function in the form f(x,s).

If a message has a specific identifier, e.g. a specific number, then the mapping function can be used to forward this message to a succeeding subscriber without changing the identifier in the process, with every subscriber that receives the message also processing it. Hence, a single message can be used to address a plurality of or all subscribers. This can be realized by means of a specific, more comprehensive mapping function for the message identifiers. In the example above, unaltered forwarding of the message and processing of the message can be initiated in the sub-unit, for example with specific mapping for message identifiers in a particular region of the admissible identifiers. By way of example, with an identifier within a defined value range, for example by virtue of for x>200 or a message with the identifier "B", the mapping f(x)=x may hold. In this case, it is also possible for processing of the message to be initiated in the sub-unit.

In addition, specific message identifiers in messages can address only particular types of subscribers. By way of example, by virtue of a mapping function that is dependent on the type of subscriber, for example for all position sensors, all linear encoders, all rotary encoders, all measuring heads, etc. This can be effected on the basis of a subscriber-type-specific identification y of the subscriber, for example, which is taken into account in the mapping function f(x,y) or f(x,s,y). On the basis of this mapping, it is possible for unaddressed subscribers to forward the message without altering or processing it, for example—whereas the addressed subscribers process this message and possibly map the identifier thereof prior to forwarding.

Expansion of the principle presented here to specific subscribers having more than two interfaces, which may therefore have more than two neighbors, can likewise be performed. In this case, for the suitable choice of the mapping function for changing the identifier, it is also possible to attain a kind of network isolation for any resultant branch or spur. If a sub-network needs to be formed between a subgroup of subscribers, for example, the latter could be isolated by using a specific mapping function and using an associated specific identifier that is only directed by the other subscribers but not changed. For the communication of a subgroup formed in this manner, the remainder of the subscribers would be effectively non-existent.

This invention can be used wherever devices in a measuring system communicate with one another via a bus. Particularly the components in measuring devices, such as articulated arms, coordinate measuring devices or machines (CMM) or geodetic instruments, may be embodied as a subscriber to communication according to the invention.

The method for machine communication according to the invention can be used advantageously for CMMs when changing the measurement sample, for example. The new sample with its measuring sensor system as (a) newly added subscriber(s) in the communication system of the CMM automatically inserted into the existing communication system. This does not require prior stipulation of explicit, specific addresses for these devices. The same sample can be used on different or differently configured measuring devices without the need for anything to be altered in said measuring devices or the settings thereof. In the event of servicing too, it is possible—using the method according to the invention and with subscribers or devices that are embodied according to the invention—to exchange the components of the machine that are involved in communication easily for similar components without the need for a service engineer to allocate communication addresses specific to the substitute components or to make changes to the machine configuration in the control unit.

BRIEF DESCRIPTION OF THE DRAWINGS

The method according to the invention and the apparatus according to the invention are described in more detail below purely by way of example with reference to specific exemplary embodiments that are schematically shown in the drawings. At the same time, further advantages of the invention are also discussed. In the drawings, specifically:

FIG. 4 shows a chart for a first exemplary sequence of machine communication according to the invention;

FIG. 5 shows a chart for a second exemplary sequence of machine communication according to the invention;

FIG. 6 shows a chart for a third exemplary sequence of machine communication according to the invention;

FIG. 7 shows a chart for a fourth exemplary sequence of machine communication according to the invention;

FIG. 8 shows a chart for a fifth exemplary sequence of machine communication according to the invention;

FIG. 9 shows a chart for a sixth exemplary sequence of machine communication according to the invention;

FIG. 10 shows a chart for a seventh exemplary sequence of machine communication according to the invention;

DETAILED DESCRIPTION

Figure 1:
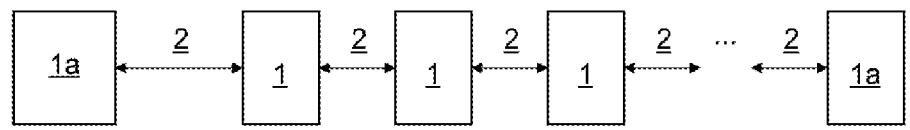
FIG. 1 shows a first exemplary embodiment of a communication system according to the invention.

FIG. 1 shows an exemplary embodiment of a communication system 10 according to the invention for the bidirectional exchange of messages via a serial structure of subscribers. The subscribers 1, 1a of the communication system, in this case also called devices 1, 1a, have interfaces for the exchange of messages that can be used to set up a communicative connection between the subscribers 1, 1a by means of cables or lines. In this case, these devices 1, 1a can be attributed a wide variety of functions and tasks, for example sensors, actuators, gateways, controllers, etc. The subscribers 1, 1a have at least two interfaces, as a result of which they can each be connected to a predecessor subscriber and a successor subscriber via respective communication lines. Consequently, a connection to the left or right is also referred to in this case in line with the illustration. The subscribers 1, 1a are thus arranged in succession in a kind of chain in the line-connected communication system 10. The subscribers 1, 1a form—as the figure shows—a serial structure in which a subscriber 1, 1a is respectively connected to its neighbor on a one-to-one basis via a line, with a first and a last subscriber 1a in the serial structure clearly each having a connection 2 only to a single one of its communication interfaces. Accordingly, the last and first subscribers 1a in each case could also have just one interface, particularly if their position as a last or first subscriber is fixed, specifically if no expandability of the communication system with further subscribers 1, 1a is meant or needs to be possible in this direction.

In one specific embodiment, the last and the first subscriber in the serial structure can also have two communication interfaces each. Hence, it is also possible for a communication link to be set up between the last and the first subscriber, so that the last subscriber precedes the first and the first succeeds the last, so that the arrangement of the subscribers results in a ring in which communication according to the invention takes place. It is therefore possible to dispense with the need to send a message, specifically a broadcast or multicast message, on both communication interfaces of a subscriber, for example. In order to prevent the same message from circulating repeatedly on a ring, it is possible in this case to implement mechanisms for not forwarding dedicated messages that are received again, however, for example in mapping functions and processing criteria that are appropriately conditioned in this regard.

Within the context of the previously described expandability or flexible exchangeability of subscribers 1, 1a in the communication system 10 and the preferable similarity and substitutability of the subscribers in the communication system, all subscribers preferably have two interfaces, even if this were not absolutely necessary in the case of the first and/or last subscriber 1a in the chain and one of the two interfaces thereof remains unused. In another embodiment, a subscriber 1a may be in the form of a controller, for example, that is always at the end of the communication structure 10 and accordingly has only one interface, but the bus can be expanded in the other direction, with an interface of the last subscriber always remaining open and if need be being terminated by a specific dummy connector. In the communication system, such a controller has the same rank as the other subscribers, however, and it thus performs no control tasks in the interests of a communication master that allocates addresses, for example, but rather the control of the controller relates to control of the technical functions of the measuring system as such—and particularly not to control of the communication (that is to say no configuration of the setpoint criteria or of the mapping, for example, specifically no subscriber-specific configuration thereof). Specific subscribers to the communication may also have more than two interfaces in order to provide branches, as has already been explained.

In this case, the interfaces can be controlled independently of one another. By way of example, there were thus not two parallel-connected connectors involved, between which communication lines are looped through and that are tapped in the device, as is the case for the CAN bus, for example. There are two fully fledged independent communication interfaces that can communicate with an interface of a neighbor bidirectionally, that is to say in half-duplex or full-duplex mode. The communication can be effected not only by means of electrical signals in electrical cables but also by means of light in optical fibers, for example.

The invention provides an improved method for bidirectional communication between subscribers in a measuring system. In particular, the measuring system is a position measuring system of a CMM in which the subscribers are in the form of measuring sensors.

In this case, the subscribers are arranged in a chain-shaped serial structure in which—apart from a first and a last of the subscribers in the serial structure—each of the subscribers is connected by means of a first communication interface to one of the subscribers in front and by means of a second communication interface to one of the subscribers behind, via a respective dedicated line.

Each subscriber has a message processing unit that could be used to control the first and second communication interfaces to send and/or receive a message independently of one another.

The communication by the message processing unit is effected by means of reception of the message as a digital data structure via the first communication interface, and evaluation of an identifier region of the message, by means of comparison of a content of the identifier region with prescribed setpoint criteria. In this case, the identifier region contains information about the message handling by the subscriber, as explained in detail below with reference to examples.

On the basis of the comparison result, the content of the identifier region of the message is modified using a prescribed mapping function with subsequent forwarding of the message that has had its identifier region modified via the second communication interface and/or processing of the message in the subscriber.

In this case, the mapping function determines from the received content of the identifier region a content that needs to be sent for the identifier region.

In this method, particularly the setpoint criteria and the mapping function may be the same in all subscribers. The setpoint criteria and the mapping function are thus subscriber-invariant—or in other words—the setpoint criteria and the mapping functions for the communication according to the invention are not configured on a subscriber-specific basis, but rather the messages are modified in all of the subscribers on the basis of similar criteria and mappings. In this case, particularly the setpoint criteria and the mapping function may be firmly stored in the subscribers. Specifically, all subscribers for the communication are in a form with equal rank in respect of their communication with one another, so to speak, with particularly none of the subscribers being in the form of a communication master that assigns respective subscriber-specific setpoint criteria and/or mappings to other subscribers.

In this case, the mapping function may be chosen such that groups of subscribers are formed and simultaneously addressed. In particular, the mapping function may be chosen in this case such that it is possible for a broadcast or multicast to be performed for the message.

In this case, the modification can be effected on the basis of that one of the communication interfaces at which the message has been received.

On the basis of the message, particularly the identifier thereof, the processing can prompt generation and dispatch of a response message for the received message
  via the first interface,
  via the second interface or
  via all interfaces.

On the basis of the message, particularly the identifier thereof, it is also possible for no generation and dispatch of a response message to be prompted, however.

A special unicast content of the identifier region can be used in the measuring system to execute a unicast (U) in which the mapping function prompts decrementing of the content of the identifier region. In this case, the processing can be effected when the content of the identifier region has a prescribed value, for example the value zero.

A special broadcast content of the identifier region can be used in the measuring system to execute a broadcast (B) in which the message is processed by all subscribers and—using mapping that does not alter the content of the identifier region—forwarding of the message is performed.

A special multicast content of the identifier region can be used in the measuring system to execute a multicast (M) in which the message is processed by a subset of all subscribers, which comprises more than one subscriber, and the message is forwarded using mapping that does not alter the content of the identifier region.

A special response content of the identifier region can be used in the measuring system to execute response forwarding (A) in which the mapping function prompts incrementing of the content of the identifier region.

In this case, the avoidance of access conflicts for one of the communication interfaces involves received messages being buffer-stored in the message processing unit.

The invention relates not only to the method but also the subscribers to bidirectional measuring system communication. In this case, the subscribers are particularly in the form of a measuring sensor in a position measuring system of a CMM.

In this case, the subscribers have a message processing unit that is designed such that it performs a communication method, and also at least two communication interfaces that can be controlled independently of one another by the message processing unit and—apart from a first and a last subscriber in the chain—can be connected to a subscriber in front and a subscriber behind. By way of example, these communication interfaces may be designed in accordance with the RS422, RS423, RS323 or RS485 specification, but other physical layers can also be used.

In this case, a synchronization interface can be used to synchronize a subscriber-internal, local clock signal in all subscribers, as described in detail in EP 2 533 022, for example.

Subsequently, the invention also relates to a coordinate measuring device having a communication system with subscribers that are described here, which operates on the basis of the method according to the invention. In this case, particularly one or more of the subscribers may be in the form of a subscriber that can be replaced during operation and that can be connected to the communication system, specifically in the form of a replaceable measurement sample subscriber.

Since the message processing units in the subscribers of the measuring system are usually embodied as digital data processing units, the invention also comprises a computer program product having program code that is stored on a machine-readable storage medium or is transmitted as a computer data signal, embodied by an electromagnetic wave, in order to carry out the method. This applies particularly when the program code compares a content of an identifier region of a received message with a setpoint condition and takes the comparison result as a basis for modifying the content of the identifier region in accordance with the mapping function and then forwards the modified message and/or processes the message locally.

Figure 2:
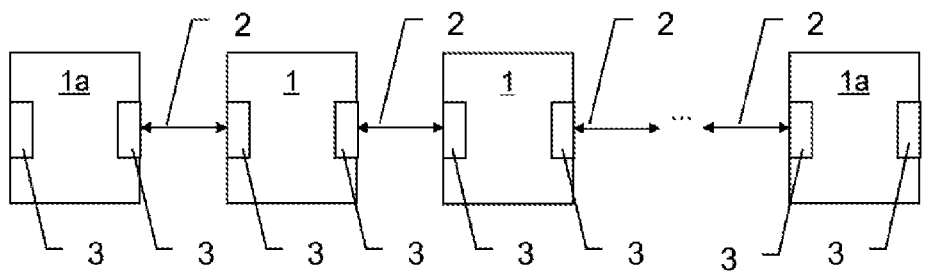
FIG. 2 shows a second exemplary embodiment of a communication system according to the invention.

FIG. 2 shows an embodiment with subscribers 1 that each have two communication interfaces 3 that the subscribers each use to set up a direct bidirectional communication relationship with a left and a right neighbor via the connection 2 (obviously apart from the respective ends of the chain of devices that is formed thereby). In the communication system shown, there is no communication master—all subscribers have equal authorization at the level of the communication. In this case, each of the subscribers can dispatch messages spontaneously, that is to say autonomously, and at any instant and does not first have to await communication assignment from a master. There are thus no tokens, time slots or data frames, prescribed by the master, used in which a subscriber enters his data.

The communication method without address allocation that is applied in this case and is in accordance with the invention, which can also be called an addressless communication method, is based—in its basic principle—on mapping and forwarding of messages between the two interfaces, as shown by way of example with reference to the sequences below.

If a message, in this example a request with an identifier "R0"—which can be interpreted in this good example as "R" for "Request" and an identification of "0"—comes to a device from the left, said device considers itself addressed, processes or evaluates the message ("eval" in FIGS. 4 to 10) and responds thereto with the associated response in the form of a message with an identifier "A"—which can be interpreted in this good example as "A" for "Answer"—using the interface from which the request came. As a variant, the device can also respond in the other or in both directions when another identifier has been received. In the case of a message with yet another identifier, a response from the addressed device may also fail to appear—the device thus processes the received message without returning a response or confirmation. For a request from the right—that is to say for a message that is received via the other communication interface—a similar situation applies.

When a message passes through a device, the identifier—in this good example the identification thereof, to be precise—is modified by a mapping function in the process. This can be effected on the basis or regardless of whether the respective device is addressed by the identifier and is also processing the message. In the good example, the identification is thus specifically increased or decreased in an order of rank. As a result, the identifier contains a piece of information about the relative position of the device in the communication system that has dispatched, processed or needs to process the message. Whether and how an identifier is varied may be dependent on the respective message. Alternatively, additional information stored in the respective subscriber can also be involved in the mapping performed in this case, as has already been described above, for example.

By way of example, an identifier that changes during forwarding can be used in the case of an enquiry that prompts a plurality of or all subscribers to give a response—that is to say what is known as a broadcast or multicast—in order to be able to associate the response messages generated by each device in this case with the respective devices.

By way of example, it is possible—with appropriate mapping functions and matching identifiers for the messages—for a message to prompt a device to send said message or another message to the next but one device and/or to send a message back to the previous device, etc.

This message can in turn prompt the addressed device (or the addressed devices) to send a further message to one or more other devices, etc.

As a result of the identifiers of the messages being mapped according to the invention, a kind of relative communication for the devices in the series is therefore achieved without different addresses being stipulated for said devices on a device-specific basis.

Any problems in accessing an interface, specifically collisions between a plurality of messages that are meant to be transmitted via the same interface at the same time, can be solved using a buffer store for messages. Given appropriate choice of the buffer storage algorithm, it is possible to prescribe the order of responses for an enquiry to a plurality of devices such that said order is always the same and said order results in a distinct association between the messages and the devices, as a result of which it is also possible to dispense with mapping of the identifier for the responses, for example.

Figure 3:
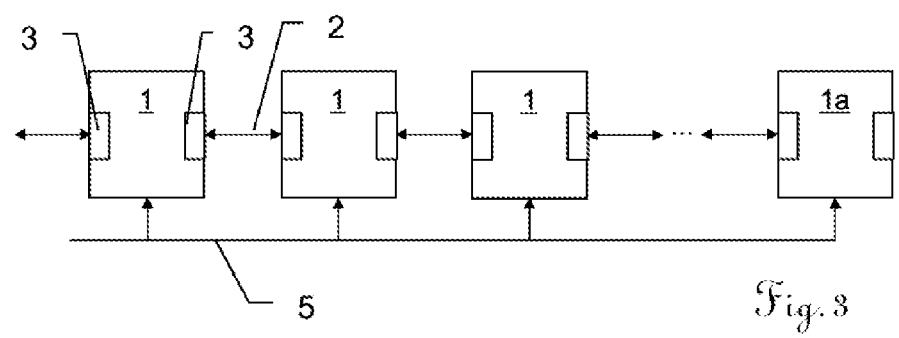
FIG. 3 shows a third exemplary embodiment of a communication system according to the invention with an additional synchronization line.

In addition to the communication system 10 from FIG. 2, FIG. 3 also shows a synchronization line 5 that addresses all devices in parallel. By way of example, such synchronization lines 5 are customary in measuring systems in the form of a trigger line for initiating measurements. In an enhancing embodiment, the synchronization line 5 may also be a combined clock trigger line, as described in EP 2 533 022.

As further explanation, a few exemplary embodiments of the communication sequences in a measuring machine communication system according to the invention are presented in table form below, the essential sequences each being presented chronologically in rows beneath one another. This listing is not conclusive, however, but rather serves only to explain the communication principle according to the invention.

FIG. 4 shows a first example of a sequence for communication according to the invention. The device I, which is a subscriber, receives via its first interface, that is to say from the right, a message with the identifier R0. The evaluation of this identifier results in this message needing to be processed by the device I, and in a response A needing to be generated that is returned to the right via the reception interface, that is to say in this case via the first interface. For other identifiers, processing can also take place in which no response is generated and therefore no new message is transmitted either.

FIG. 5 shows a second example of a sequence for communication according to the invention in which the device IV receives on its second interface, that is to say from the left, a message with the identifier R1. The evaluation of the identifier of this message results in said message not needing to be processed, but rather the identifier being modified with a mapping function $f(x)=x-1$ and the modified message with the identifier R0 needing to be forwarded via the other, in this case the first, interface, to the left. The device III, which receives and evaluates this message R0 via its right interface, processes this message, with a response with the identifier B being generated that is transmitted in the same direction as that from which the associated enquiry R0 was received, that is to say likewise via the right interface to device IV. The device IV applies the mapping function $f(x)=x$ to the message with the identifier B and forwards the message—in this case with unaltered mapping—to its right neighbor.

FIG. 6 shows a third example of a sequence for communication according to the invention in which the device I receives a message with the identifier R that prompts the device to process the message internally and also to forward it to the next subscriber via the respective other interface with a on the basis of the mapping function $f(x)=x$—that is to say in this case, as already previously, with mapping of the identifier that results in the same identifier. In the course of the processing, a response message D0 is generated that is transmitted via the same interface as that via which the message R was received.

The same is repeated for each of the subsequent devices II, III and IV. The responses from these further devices are denoted by different identifiers E0, F0, G0 in the figure, but the identifiers of the responses may by all means be the same for each of the devices. Thus, all devices can respond to this enquiry with D0. The illustration with different identifiers that is chosen in the figure is used primarily for clarity, and in the interests of similarity of the devices each device would respond with D0. If the device III now receives a message with the identifier G0, for example, it applies the mapping function $f(x)=x+1$ and forwards the message with the amended identifier G1 via the other interface. The devices III, II and I proceed in a similar manner with the messages E, F and G which they receive from the right.

This example can be referred to as communication in the form of a broadcast that addresses all subscribers, in which each subscriber returns a response. By way of example, in a measuring device with such communication, an actual value or a measured value from earlier triggering can be requested from all position sensors. The receiver of D0, E1, F2 and G3 can distinguish these messages from their number of the identifier and associate them with the relevant devices (even if, as mentioned above, all subscribers had responded with a D identifier). In another embodiment, in which the responses from the devices have an identifier for which the identifier is not altered by the mapping during forwarding (for example as in the case of the identifiers B from the previous example), an association between the messages and the devices is set up by means of the order of arrival of the messages.

In the case illustrated here, to avoid access conflicts on the interfaces, it is possible to perform buffer-storage for received messages and/or messages generated by the respective device itself.

FIG. 7 shows a fourth example of a sequence for communication according to the invention in which the device I receives a message with an identifier R0 that satisfies the condition for processing in the device but does not prompt forwarding of the message. However, the processing results in the response B, which is transmitted to the device II on that interface on which the message R0 was not received. The subsequent devices II, III and IV receive the message B, apply the mapping function $f(x)=x$ and forward the message on the respective opposite interface.

FIG. 8 shows a fifth example of a sequence for communication according to the invention in which the device I receives a message with an identifier V2 on the left interface, uses the relevant mapping to decrement the identifier and forwards the message with the mapped identifier V1—but otherwise unaltered message content—via the other, right interface. Device II proceeds in similar fashion and sends the message with the identifier V0 to device III. The message identifier V0 then prompts the device III to process the message and no longer forward it. In the course of the processing, a message W is generated that is dispatched via both interfaces of the device III. The devices that receive the message W forward it with an unaltered identifier on the respective other interface, as a result of which the message W is distributed over all communication subscribers. The messages with the identifier W are furthermore also processed in all devices. However, no active responses are transmitted for these W identifiers. Any information resulting from processing of the message with the W identifier can alternatively also be read by virtue of active enquiry after this information by means of further messages, as shown in FIG. 6, for example.

In a measuring machine, the message V can mean, by way of example, processing in the form of checking for whether a threshold value that may be contained in the message is exceeded by a measured value. If said threshold value is found to be exceeded, this information about the message with the identifier W is communicated to all communication subscribers, which can react in suitable fashion by processing the W message.

FIG. 9 shows a sixth example of a sequence for communication according to the invention in which device I receives a message as a request with the identifier K2 from the left, maps said message and transmits it as request K1 to device II, which in turn maps it and forwards it as request K0 to device III. Device III processes the content of this message K0 and returns a response message G0 to the left on the reception interface. The message identifier G0 received from device II is mapped by virtue of the identifier being incremented, and therefore the received message with the modified identifier G1 is forwarded. A similar process occurs in device I, which forwards a message G2. The device 0, not shown here, that has dispatched the enquiry K2 can now process the expected message G2, and no longer forward it, for example, when it arrives.

FIG. 10 shows a seventh example of a sequence for communication according to the invention in which device II takes an initiating event as a basis for transmitting a message with the identifier R1 to the right. The receiving device III maps the received identifier R1 under R0 by means of decrementing and sends the message to the right to the device IV. The latter processes the message with R0 and in so doing generates a response message that transmits with the identifier G0 in the direction of the previous reception, that is to say to the left to device III. This device III maps the identifier G0 to G1 by incrementing and forwards it to the left. Device II has awaited an appropriate response with an identifier G1 in response to its previous enquiry with the identifier R1, and therefore processes the received message with the identifier G1. As the result of the processing, device II transmits a message with the identifier W to the left to device I.

The identifiers used in the examples above can be regarded as purely exemplary for the clear explanation of the communication principle according to the invention. The identifiers may also be implemented more abstractly in practical use, particularly in the form of digital codings. The processing criterion for an identifier that has a zero, which is explained by way of example here, can also be regarded as purely exemplary. Accordingly, the mapping functions and evaluations stored in the devices may also be correspondingly more complex. In particular, the identifiers and the mappings and criteria therefor do not have to be embodied in a form that can be read by humans.

Figure 11:
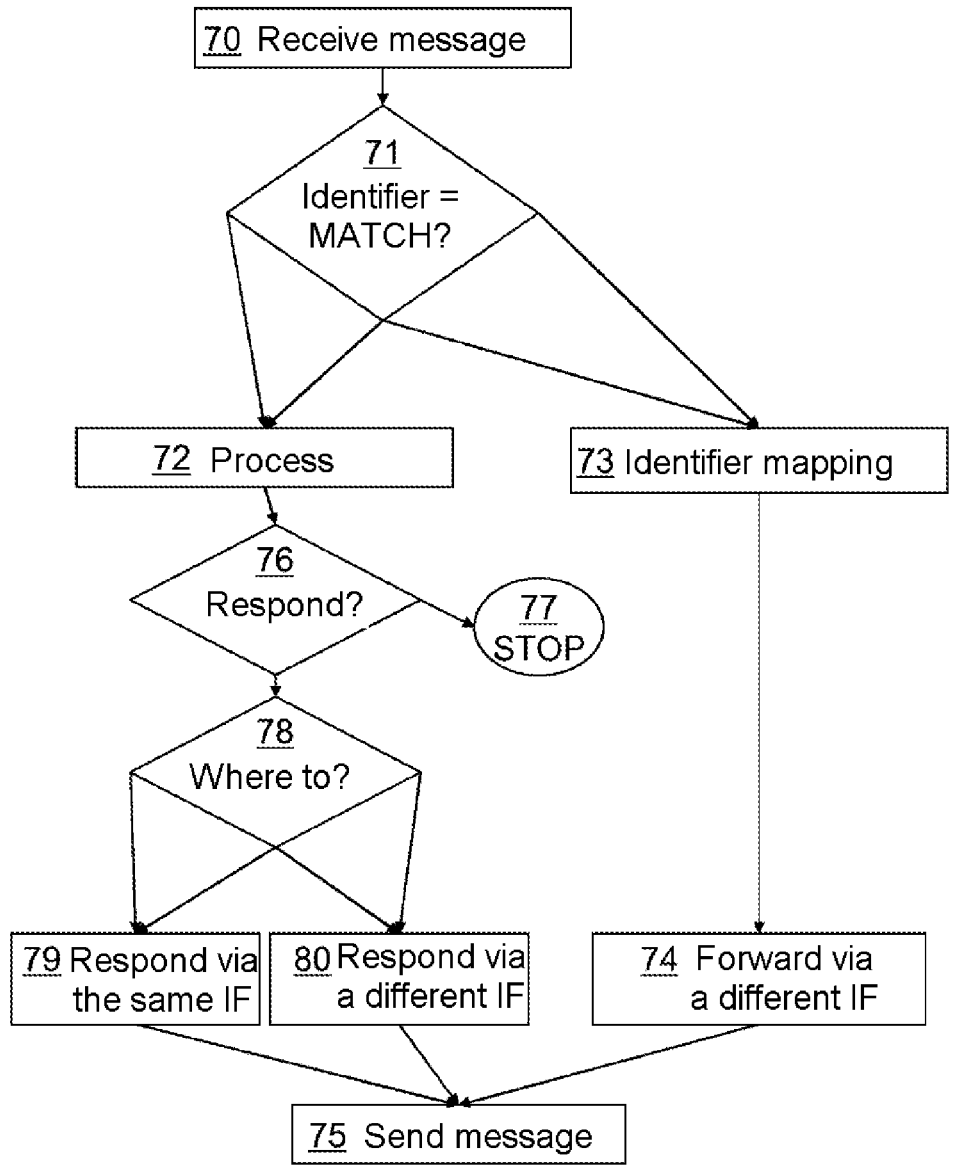
FIG. 11 shows a first exemplary, simplified flowchart for an embodiment of machine communication according to the invention.

FIG. 11 shows a first example of a sequence for communication according to the invention in a flowchart. A message 70 received from the subscriber is evaluated in the evaluation 71 on the basis of its identifier. Depending on the result of the evaluation, processing 72 or identifier mapping 73 or else both the processing 72 and identifier mapping 73 are performed.

In this case, the identifier mapping modifies the identifier on the basis of the received identifier, and in this context modification can also be understood to mean one-to-one mapping, that is to say returning the identifier. Following the identifier mapping 73, the message is forwarded via a different interface than the one at which the message was received. This interface is then used to send 75 the modified message.

During the processing 72, the subscriber can take the content of the received message as a basis for executing a wide variety of functions. If need be, the processing 72 can also initiate a response 76 with generation of a response message. Otherwise, the processing is terminated at point 77. Any response message generated is then assigned to the reception interface in block 79, assigned to the other interface in block 80 or assigned to both interfaces via both blocks 79 and 80, according to the choice 78 stored for the processing. This is followed by the sending 75 via the relevant interface(s).

Figure 12:
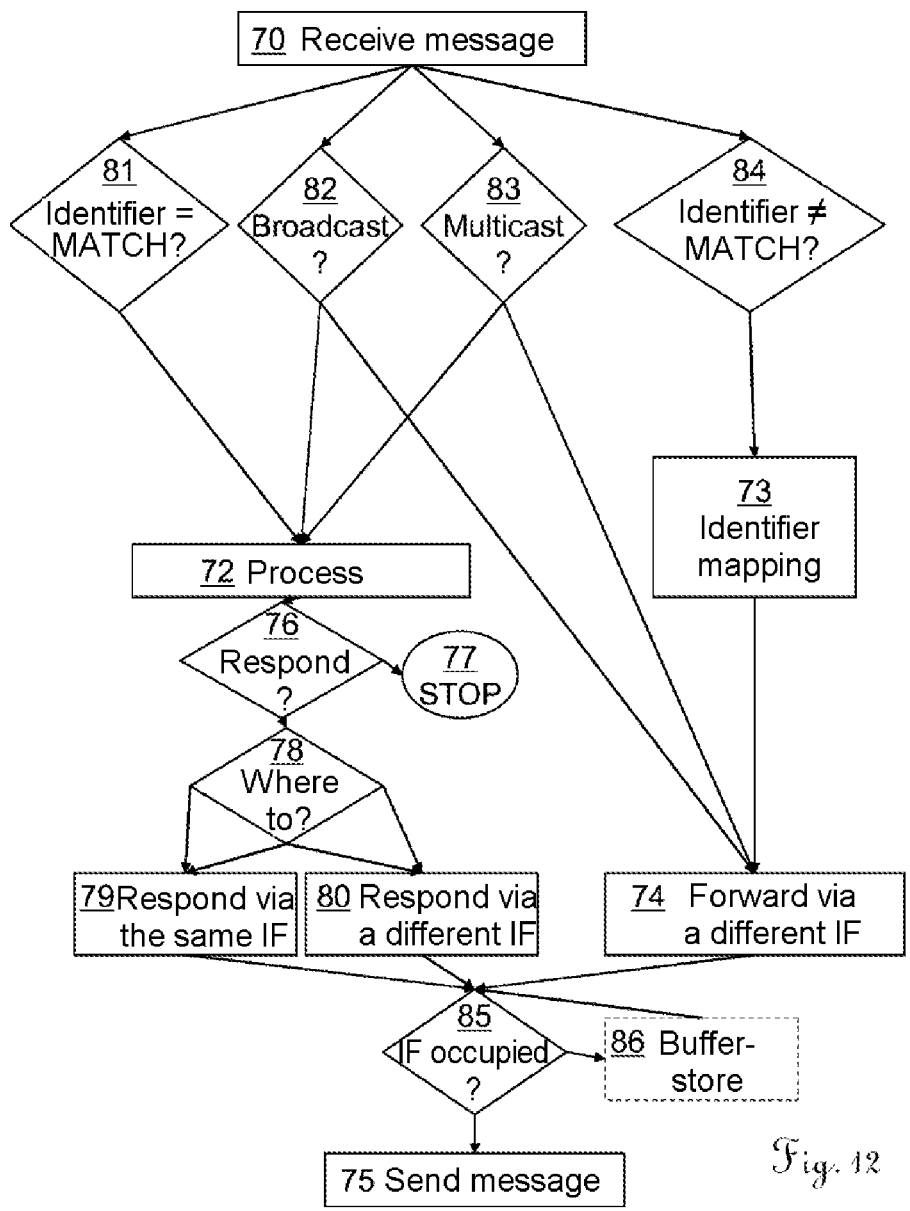
FIG. 12 shows a second exemplary, simplified flowchart for an embodiment of machine communication according to the invention.

FIG. 12 shows a second example of a sequence for communication according to the invention in a flowchart that is expanded in comparison with the first. The message received in block 70 is now repeatedly evaluated on the basis of its identifier, with several of the evaluations also possibly applying.

Evaluation 81 applies when the identifier satisfies a unicast processing criterion, which applies for the identifiers R0, for example, in the examples explained above. This is followed by the processing 72 already explained above, and any response generation 76, 78, 79, 80.

Evaluation 82 applies when the identifier is interpreted as a broadcast, which applies for the identifiers R and W, for example, in the examples explained above. This is followed by the processing 72 already explained above, with any response generation 76, 78, 79, 80, and also alternatively forwarding 74 of the message.

Evaluation 83 applies when the identifier is interpreted as a multicast, that is to say when the identifier satisfies a certain criterion that can apply for a subset of the subscribers (e.g. all linear encoders, all limit switches, etc.). For the stipulation of the criterion, it is also possible to use further information from the message and/or the subscriber in a manner specific to the identifier. This is followed when applicable by the processing 72 already explained above, with any response generation 76, 78, 79, 80, and also alternatively forwarding 74 of the message.

Evaluation 84 prompts the mapping 73 already explained above—for which further information from the message and/or the subscriber can also be used—and then the forwarding 74.

Before the message is dispatched in block 75, the message can be buffer-stored 86 at test 85 if a transmission interface is occupied.

Figure 13:
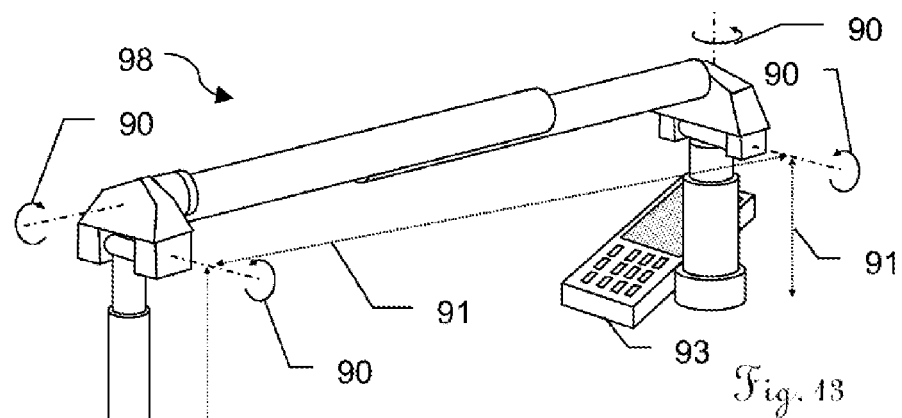
FIG. 13 shows a first example of an embodiment of a measuring machine in which the machine communication according to the invention is applied.

FIG. 13 shows a first example of a measuring system 98. The measuring device 98 shown is in the form of an articulated arm that is equipped with linear encoders or rotary encoders 90 at its movement axes. The articulated arm also has a replaceable measuring head 92 and a control unit 93. In this case, the devices involved in the measurement, that is to say specifically the linear encoder 91, the rotary encoder 90, the measuring head 92 and the control unit 93, are subscribers in the communication system according to the invention.

Figure 14:
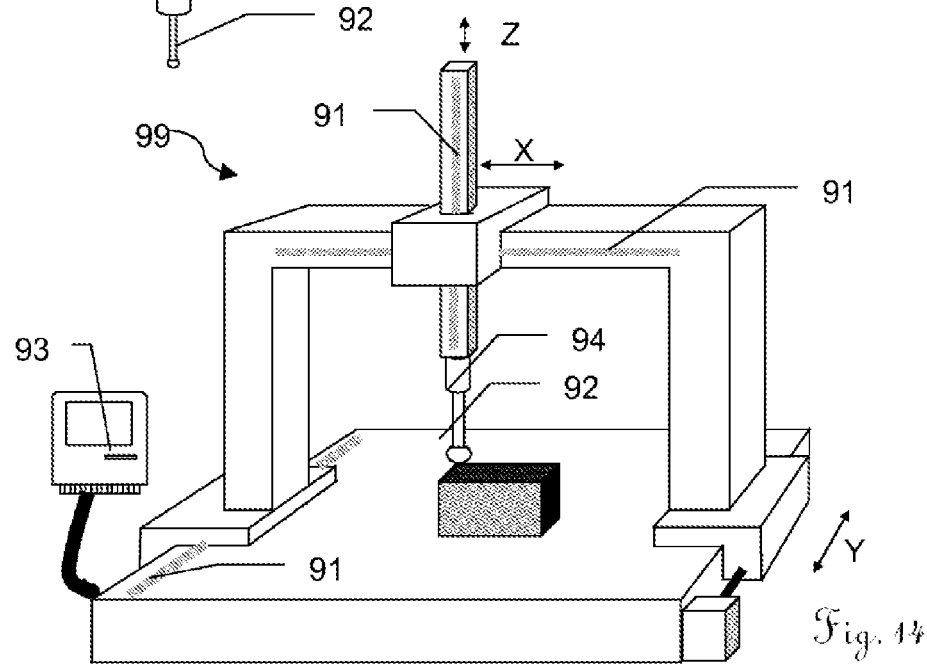
FIG. 14 shows a second example of an embodiment of a measuring machine in which the machine communication according to the invention is applied.

FIG. 14 shows a second example of a measuring system 99. The measuring device 99 shown is in the form of a coordinate measuring device of portal design that is equipped with linear encoders 91. In this case, a replaceable measuring head 92 is fitted to a swivel head 94. An external control unit 93 coordinates the measuring sequences. The data-processing devices or components with which the measuring system is equipped, that is to say specifically the linear encoders 91, the motorized swivel head 94, the measuring head 92 and the control unit 93, are in this case in the form of subscribers in the communication system according to the invention, which communication system can be used to actuate or poll them by means of communication lines.

Besides the measuring systems shown explicitly in FIG. 13 and FIG. 14, the communication method according to the invention can also be used in measuring systems of other design, for example in theodolites, total stations, laser trackers, laser scanners, etc.

What is claimed is:

1. A method for line-connected bidirectional communication between subscribers in a position measuring system of a coordinate measuring device, the position measuring system comprising an arrangement of the subscribers in a chain-shaped serial structure in which, apart from a first and a last of the subscribers in the serial structure, each of the subscribers is connected by means of a first communication interface to one of the subscribers in front and by means of a second communication interface to one of the subscribers behind,
wherein each subscriber has a message processing unit that can be used for controlling the first and second communication interfaces to send and/or receive a message independently of one another, and
the method comprising:
receiving the message as a digital data structure via the first communication interface;
evaluating an identifier region of the message, which region contains information about the message handling by the subscriber, by means of comparison of a content of the identifier region with prescribed setpoint criteria;
on the basis of the comparison result, modifying of the content of the identifier region of the message using a prescribed mapping function that uses the received content of the identifier region to determine a content that needs to be sent for the identifier region;
subsequently forwarding of the message that has had its identifier region modified via the second communication interface; and
processing of the message in the subscriber.

2. The method as claimed in claim 1, wherein the setpoint criteria and the mapping function are the same in all subscribers, wherein the setpoint criteria and the mapping function are firmly stored in the subscribers.

3. The method as claimed in claim 1, wherein all subscribers to the communication have equal rank among one another in respect of their communication, and
wherein none of the subscribers is in the form of a communication master that respectively assigns subscriber-specific setpoint criteria and/or mappings to other subscribers.

4. The method as claimed in claim 1, wherein the mapping function is chosen such that groups of subscribers are formed and simultaneously addressed, wherein the mapping function is chosen such that it is possible to perform a broadcast or a multicast for the message.

5. The method as claimed in claim 1, wherein the modification is effected on the basis of that one of the communication interfaces of the subscriber at which the message has been received.

6. The method as claimed in claim 1, wherein on the basis of the message or the identifier of the message the processing prompts generation and dispatch of a response message for the message via at least one of the first interface, the second interface, or all interfaces.

7. The method as claimed in claim 1, wherein on the basis of the message or the identifier of the message the processing prompts no generation and dispatch of a response message.

8. The method as claimed in claim 1, wherein:
a special unicast content of the identifier region is used in the measuring system to execute a unicast in which the mapping function prompts decrementing of the content of the identifier region, and
the processing is performed for a content of the identifier region with a prescribed value.

9. The method as claimed in claim 7, wherein the prescribed value is zero.

10. The method as claimed in claim 1, wherein a special broadcast content of the identifier region is used in the measuring system to execute a broadcast in which the message is processed by all subscribers and the message is forwarded using mapping that does not alter the content of the identifier region.

11. The method as claimed in claim 1, wherein a special multicast content of the identifier region is used in the measuring system to execute a multicast in which the message is processed by a subset of all subscribers, which comprises more than one subscriber, and the message is forwarded using mapping that does not alter the content of the identifier region.

12. The method as claimed in claim 1, wherein a special response content of the identifier region is used in the measuring system to execute response forwarding in which the mapping function prompts incrementing of the content of the identifier region.

13. The method as claimed in claim 1, wherein the avoidance of access conflicts for one of the communication interfaces involves received messages being buffer-stored in the message processing unit.

14. The method as claimed in claim 1, wherein the communication is also effected between a first communication interface of the first of the subscribers and a second communication interface of the last of the subscribers, so that the first of the subscribers is behind the last of the subscribers and the last of the subscribers is in front of the first of the subscribers and the serial structure of the subscribers is closed to form a ring.

15. A subscriber to bidirectional line-connected measuring system communication of a coordinate measuring device, the subscriber comprising:
message processing unit; and
at least two communication interfaces that can be controlled independently of one another by the message processing unit and can be connected to a subscriber in front and a subscriber behind,
wherein the message processing unit is configured to:
receive the message as a digital data structure via the first communication interface;
evaluate an identifier region of the message, which region contains information about the message handling by the subscriber, by means of comparison of a content of the identifier region with prescribed setpoint criteria;
on the basis of the comparison result, modify of the content of the identifier region of the message using a prescribed mapping function that uses the received content of the identifier region to determine a content that needs to be sent for the identifier region;

subsequently forward of the message that has had its identifier region modified via the second communication interface; and process of the message in the subscriber.

16. The subscriber as claimed in claim 15, wherein the subscriber to bidirectional line-connected measuring system communication comprises a measurement sensor in a position measuring system.

17. The subscriber as claimed in claim 15, wherein the communication interfaces are designed in accordance with the RS422, RS423, RS323 or RS485 specification.

18. The subscriber as claimed in claim 15, wherein a synchronization interface is used to synchronize a subscriber-internal, local clock signal in all subscribers.

19. The subscriber as claimed in claim 18, wherein local clock signal comprises a combined clock trigger signal.

20. A coordinate measuring device having a line-connected communication system with subscribers as claimed in claim 15.

21. One or more non-transitory computer-readable media storing one or more programs that are configured, when executed, to cause one or more processors to execute the method as recited in claim 1, wherein the one or more programs compares a content of an identifier region of a received message with a setpoint condition and takes the comparison result as a basis for modifying the content of the identifier region in accordance with a mapping function and then forwards the modified message and/or processes the message locally, preferably when the program is executed in a subscriber of a measuring system, specifically in the message processing unit thereof.

* * * * *